March 13, 1934.  A. G. SCHAEFER  1,950,906

THERMOSTAT

Filed Aug. 5, 1932

August George Schaefer,
Inventor,
Delos F. Haynes,
Attorney.

Patented Mar. 13, 1934

1,950,906

UNITED STATES PATENT OFFICE 1,950,906

THERMOSTAT

August George Schaefer, Attleboro, Mass., assignor to General Plate Company, Attleboro, Mass., a corporation of Massachusetts Application August 5, 1932, Serial No. 627,560

10 Claims. (Cl. 297—15)

This invention relates to thermostats, and with regard to certain more specific features, to thermostats characterized by their resistance to the action of corrosive media.

Among the several objects of the invention may be noted the provision of a thermostat comprising a disc of the self-snapping type, in which the disc is formed from bimetal of optimum thermostatic characteristics, but nevertheless is subject to corrosion by various media, both liquid and gaseous, and means enclosing such disc and protecting it from such corrosive action, but without changing the operating characteristics of the disc or impairing its utility; and the provision of a thermostat of the class described which is simple and economical to manufacture. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a plan view of a thermostat embodying the present invention;

Similar reference characters indicate corresponding parts throughout the several views of the drawing.

Figure 1:
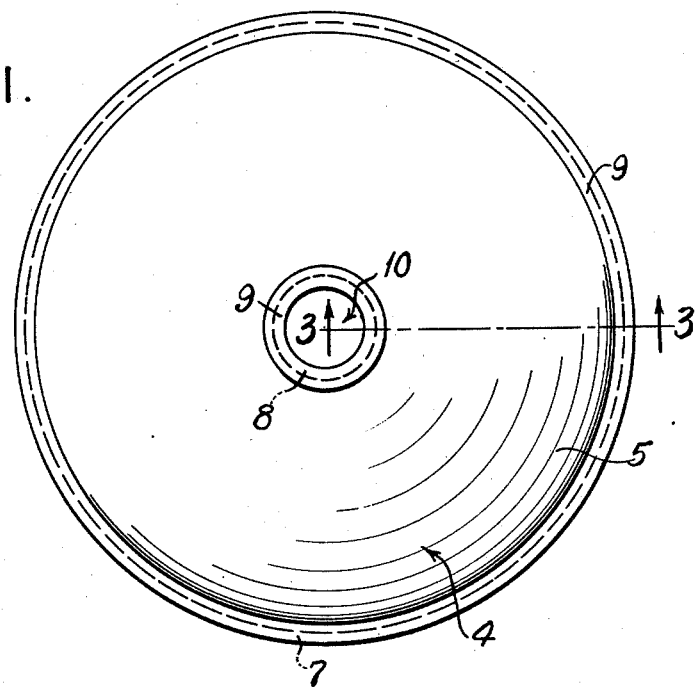
Figure 2:
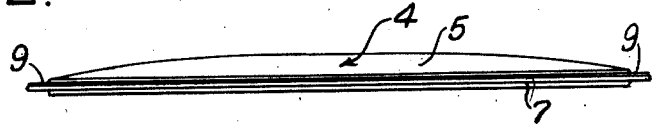
Fig. 2 is an elevation of the thermostat shown in Fig. 1.
Figure 3:
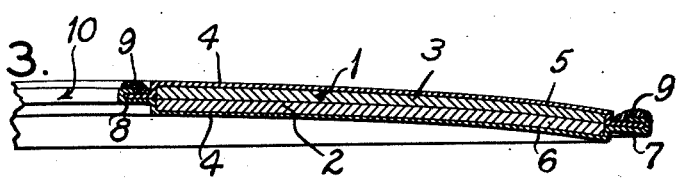
Fig. 3 is an enlarged cross section taken on line 3—3 of Fig. 1.

In Spencer Patent 1,448,240, dated March 13, 1923, is described a self-snapping bimetallic disc thermostat, which has now gone into extensive use in a variety of applications. The thermostat of this patent comprises a sheet of composite metal, or bimetal, one layer of which has a thermal coefficient of expansion differing from that of the other layer, and which sheet is provided with a non-developable portion.

Numerous metals have been found to be satisfactory as components of the composite metal or bimetal for use in the said thermostat. For example, brass and steel together make an effective bimetal. As described in Marshall Patent 1,481,021, dated January 15, 1924, a bimetal comprising Monel metal and forty-two per cent. nickel steel is also suitable. Numerous other metals find satisfactory use in particular situations.

Regardless of the particular metals used, there are situations in which the thermostat is subjected to the action of a medium which is corrosive in its action on the particular metals. For example, a brass-steel thermostat is corroded by steam. Such corrosion is highly deleterious to the thermostat, as it quickly alters the proportionate thickness of the constituent metals and thereby changes the temperature differential over which the thermostat operates.

The present invention concerns a method of protecting the thermostat from such corrosive action, and comprises, generally, enveloping the thermostat in a sheath of flexible material chosen, under the circumstances, for its resistance to the particular corrosive medium concerned.

Referring now more particularly to the drawing, numeral 1 indicates a thermostat of the type referred to, having component metallic layers 2 and 3. A central hole 10 may, if desired, be provided in the disc 1. Numeral 4 indicates an enclosing sheath or envelope of a metal proof against corrosion by the particular medium concerned.

The sheath 4 is desirably formed from relatively thin metallic foil or sheeting, at least thin enough so that it offers no substantial resistance to the movement of the disc 1 as it snaps back and forth. In the present embodiment, the sheath 4 comprises an upper cover 5 and a lower cover 6, which are secured together in a close fit around the disc 1 by outer lap seam 7 and, if there is a central hole, inner lap seam 8, both of which seams are soldered as at numeral 9. The sheath 4 need not fit tightly on the disc 1, but should not be so loose as to be subject to great movement and flexure in operation, the latter tending to wear out the sheath too quickly.

It will be noted that the sheath 4 is not permanently affixed to the disc 1 at any point, but rather is relatively free to slip or move thereon. This freedom from any metallic bond, such as soldering, brazing, welding, or the like, constitutes one important feature of the invention. Were the sheath 4 to be definitely fixed to the disc 1, as by soldering or welding (or, in the extreme, plating the sheath on the disc), the metallic bond between the sheath metal and the one or more disc metals would introduce a new bimetallic couple, which would be influenced to change shape by temperature variations, thus to subject the disc to influences or forces not provided for in its manufacture and thus vary its operating characteristics. By leaving the sheath unconnected to the disc, the above undesirable actions do not take place and the operating characteristics of the disc, as provided, remain substantially unaltered.

It will be seen that the sheath 4 neither changes the shape nor substantially affects the dimensions of the disc 1. This feature permits mounting of the improved sheathed disc in mountings similar to those used for the unsheathed disc.

Inasmuch as the sheath 4 completely encloses the disc 1, there is no chance for the corrosive medium to act upon the disc, and its operating characteristics thus remain unaltered.

The choice of the particular material to be used as the sheath of course depends upon the particular corrosive medium under consideration. The sheath need not necessarily be metallic, but it is usually possible to choose some metal which has the desired properties. For example, it has been found that a copper sheath is quite advantageously employed in positions where the thermostat is to be subjected to the effect of water.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A thermostat comprising a dished composite metallic sheet, and a sheath completely enclosing said sheet, said sheath being resistant to the corrosive effect of the medium wherein the thermostat is to be used.

2. A thermostat comprising a dished composite metallic sheet, and a sheath completely enclosing said sheet, said sheath being resistant to the corrosive effect of the medium wherein the thermostat is to be used, said sheath fitting said sheet closely, but being free of permanent attachment to said sheet.

3. A thermostat comprising a dished composite metallic sheet, and a sheath completely enclosing said sheet, said sheath being resistant to the corrosive effect of the medium wherein the thermostat is to be used, said sheath being free from said sheet in the sense that it is not connected thereto by any metallic bond.

4. A thermostat comprising a dished composite metallic sheet, and a sheath completely enclosing said sheet, said sheath being resistant to the corrosive effect of the medium wherein the thermostat is to be used, said sheath being formed of material sufficiently thin that it offers substantially no resistance to thermostatic movement of said sheet.

5. A thermostat comprising a dished bimetallic disc, and a thin metallic envelope completely enclosing said disc and fitting said disc closely, said envelope being resistant to the corrosive action of the medium wherein the thermostat is to be used.

6. A thermostat comprising a dished bimetallic disc having a central hole therein, and an envelope completely enclosing said disc, said envelope comprising a thin upper cover of corrosion-resistant material and a thin lower cover of corrosion-resistant material, said upper and lower covers being joined together at both inner and outer peripheries.

7. A thermostat comprising a dished bimetallic disc having a central hole therein, and an envelope completely enclosing said disc, said envelope comprising a thin upper cover of corrosion-resistant material and a thin lower cover of corrosion-resistant material, said upper and lower covers being soldered together in a lap seam at both inner and outer peripheries, but being free from any permanent attachment to said disc.

8. A thermostat particularly adapted for use in a medium of steam or water comprising a dished bimetallic disc and a sheath of thin copper sheet completely enclosing said disc and protecting it from the corrosive action of the steam or water.

9. A thermostat particularly adapted for use in a medium of steam or water comprising a dished bimetallic disc and a sheath of thin copper sheet completely enclosing said disc and protecting it from the corrosive action of the steam or water, said copper sheath being free from said disc in the sense that it is not connected thereto by any metallic bond.

10. A thermostat comprising a composite metallic sheet, and a sheath completely enclosing said sheet, said sheath being resistant to the corrosive effect of the medium wherein the thermostat is to be used, said sheath fitting said sheet closely, but being free of permanent attachment to said sheet.

AUGUST GEORGE SCHAEFER.